Jan. 30, 1962     M. COGNIAT     3,018,655
APPARATUS AND METHOD FOR ANALYSIS OF FLUIDS
Filed Dec. 21, 1959     2 Sheets-Sheet 1

INVENTOR.
Marcel Cogniat
BY
HIS ATTORNEYS

United States Patent Office 3,018,655
Patented Jan. 30, 1962

3,018,655
APPARATUS AND METHOD FOR ANALYSIS OF FLUIDS
Marcel Cogniat, Pierre-Benite, France, assignor to Societe d'Electro-Chimie d'Electro-Metallurgie et des Acieries Electriques d'Ugine, Paris, France, a corporation of France
Filed Dec. 21, 1959, Ser. No. 860,927
Claims priority, application France Dec. 29, 1958
2 Claims. (Cl. 73—27)

The invention relates to apparatus and method for analyzing fluids.

It is known to measure the degree of purity of a fluid to be analyzed, polluted by an impurity having a property of a value different from that of a reference fluid, by comparing said property of the polluted fluid with that of a reference fluid in a suitable differential analysis cell.

For instance, it is known to use the thermal conductivity of a gas or its heat of combustion in order to reveal the presence in it of an unknown gas having respectively a conductivity or calorific power of a value different from the value corresponding to the reference gas. Likewise, it is known to compare the electrical conductivity of a solution to be analyzed with that of a reference solution in order to determine the nature or proportion of an impurity in the solution to be analyzed.

This comparison may be made:

(1) By using a differential analysis cell having two analysis chambers as nearly identical to each other as possible and flowing only the reference fluid through one of these chambers and flowing only the fluid to be analyzed through the other of these chambers.

(2) By using only a single analysis chamber and successively flowing through it the reference fluid and the fluid to be analyzed, as described in applicant's French patent application Serial No. PV 782,813 filed December 29, 1958.

The difference of state existing constantly between the two chambers, in the first case above mentioned, or successively in the same chamber in the second case above mentioned, is a measure of the difference of compositions of the two fluids, a difference which can be measured by any means suitable to the properties of the two fluids involved.

The present invention relates to a method for analyzing fluids by means of detecting cells and distributing circuits, consisting essentially in connecting alternately two analysis chambers with the reference fluid and with the fluid to be analyzed (polluted fluid), so that each of the two analysis chambers can only be filled by one of these two fluids at the same time.

This process enables one at the same time:

(1) To prevent unequal aging (i.e., by chemical attack) of one analysis chamber compared to the other analysis chamber, as may be the case if the reference fluid is flowed only through one chamber and the fluid to be analyzed is flowed only through the other chamber.

(2) To double the sensitivity as compared with an apparatus in which the reference fluid and the polluted fluid are circulated successively through a single analysis chamber.

The invention also relates to apparatus for analyzing fluids, the apparatus comprising:

(a) A differential analysis cell having two analysis chambers, each analysis chamber being provided with a detector which is sensitive to a characteristic property of the fluid to be analyzed.

(b) A three-way valve connected at its outlet with the cell and at its inlet side with the circuit of the reference fluid and with the circuit of the fluid to be analyzed, the valve being controlled in a manner to alternately connect the cell with the source of the reference fluid and the source of the fluid to be analyzed.

(c) The two analysis chambers of the cell are connected by a delay volume device, the capacity or internal volume of which, determined from the flow and the sampling rate, is such as indicated above that at the completion of the supplying cycle the two analysis chambers may never be filled by the same fluid, and that the nature of the fluid in each chamber changes at each half cycle of the sampling.

In the case where the utilized property is the thermal conductivity of the gases, a cell for gas analysis is used according to applicant's French patent application filed May 9, 1958. Such a cell comprises essentially thermistances insulated from chemical contact with the gases involved, set-in tubular means which themselves are introduced into pipes communicating respectively with the circuit of the gas to be analyzed and with the circuit of the reference gas, and a detector or measuring means for measuring the temperatures of the thermistances.

In the accompanying drawings which illustrate a preferred embodiment of the invention:

Figure 1:
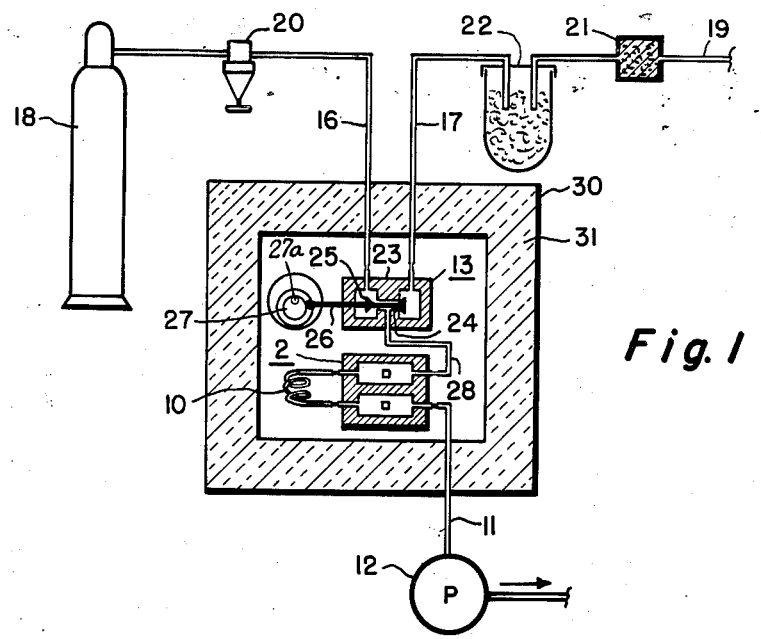
FIGURE 1 is a diagrammatic view of apparatus according to the invention for supplying and controlling the flow of reference gas and gas to be analyzed through the analysis cell.
Figure 2:
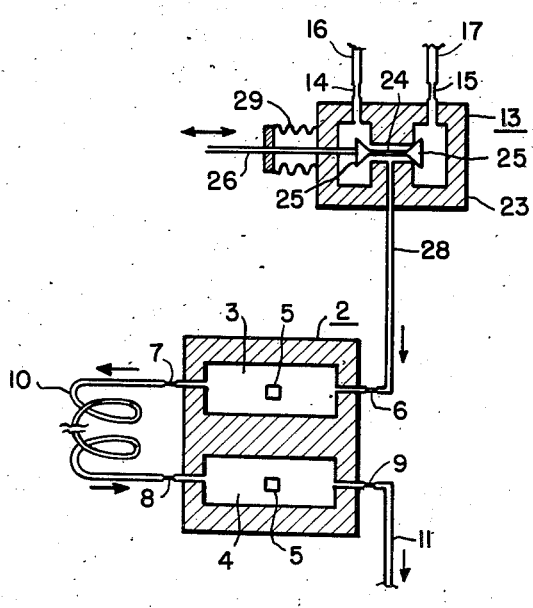
FIGURE 2 is an enlarged view illustrating a part of the apparatus shown in FIGURE 1.

Referring more particularly to FIGURES 1 and 2 of the accompanying drawings, a differential analysis cell indicated generally by reference numeral 2 comprises two analysis chambers 3 and 4, each provided with a detector 5 responsive to the physical properties of the fluids involved. The analysis chamber 3 has an entrance orifice 6 and an exit orifice 7 and the analysis chamber 4 has an entrance orifice 8 and an exit orifice 9. The orifices 7 and 8 are connected by a delay volume device 10 which is in the form of a tube and is dimensioned as hereinafter more particularly described. The chambers 3 and 4 are of substantially identical volumes and are independent pneumatically of each other. In each of the chambers 3 and 4 there may be circulated, on the one hand, a reference fluid, and, on the other hand, the fluid to be analyzed, the flow of fluids through the cell 2 always being from the inlet orifice 6, through chamber 3, then through the delay volume device 10, then through chamber 4, the fluids exiting through a duct 11 connected to an exhaust pump 12.

A three-way valve indicated generally by reference numeral 13 has its inlet orifices 14 and 15 connected respectively to ducts 16 and 17 which are connected respectively to a source of reference fluid 18 and a source 19 of fluid to be analyzed. The reference fluid flows from the source or container 18 through an expander 20 and then through the duct 16 to the valve 13. The fluid to be analyzed flows through a filter 21 and a dryer 22 and then is led by the duct 17 to the valve 13. The valve 13 comprises a casing 23, a movable valve element 24 having two heads 25 and a valve stem 26. The valve stem is connected to an eccentric 27 mounted on a shaft 27a which can be driven by any suitable means, thereby reciprocating the valve element 24 and alternately supplying charges or zones of reference fluid and fluid to be analyzed through the duct 28 to the inlet orifice 6 of the cell 2. The valve 13 is provided with a bellows 29 to prevent escape of gas from the interior of the valve while allowing reciprocation of the valve element 24.

In the operation of the apparatus, the chambers 3 and 4 are filled alternately by the reference fluid and by the fluid to be analyzed and the Wheatstone bridge of the electrical measuring circuit, hereinafter described, is unbalanced alternately in one sense and then in another sense, thus giving a periodic signal having a period T, the amplitude of which provides a measure of the degree of pollution of the gas to be analyzed.

The length of the tubular delay volume device 10 may be determined as follows:

If

L is the length of said tube,
$a$ its cross sectional area,
$d$ the volume of flow therethrough in time T, $\frac{T}{2}$ the time during which the valve is successively in each of its two positions, $v$ the volume of each chamber, it is possible to write:

$$v + aL = d \times \frac{T}{2}$$

which expresses the fact that the volume of fluid contained in each alternate zone of the gas being circulated fills exactly the tube 10 and one of the chambers 3 or 4.

In practice, $v$ may be neglected in comparison with $aL$ and one can write:

$$L = \frac{dT}{2a}$$

The volume $aL$ is the delay volume.

The period T is usually so chosen that during the passage of a zone or charge of fluid into one of the chambers 3 or 4, the signal reaches approximately its asyptotic value. For instance, for thermal differential cells having a time constant of 5 seconds, $$\frac{T}{2}$$

will be chosen equal to about 15 seconds.

If use is made of ionization cells having a very low inertia, $$\frac{T}{2}$$

will be made equal, for instance, to one second.

Under these conditions $\left( \frac{T}{2} \right.$ being equal to or greater than three times the time constant$\Big)$ it is not necessary to provide a very great constancy of fluid flow nor a strict equality of pressure of the fluids in the feeding ducts 16 or 17. For instance, a difference of flow or of pressure of 10% produces only a variation in measurement of 1% of the amplitude of the periodic component of the collected signal in the measuring device. It is sufficient to filter that periodic component in order to obtain a measurement which is unaffected by any drift. A current-rectifier of any known type, operated in synchronism with the three-way valve 13, may afterwards transform the alternating signal received into a continuous signal, the polarity of which indicates the direction of variation of the physical characteristics utilized in the detectors.

Figure 3:
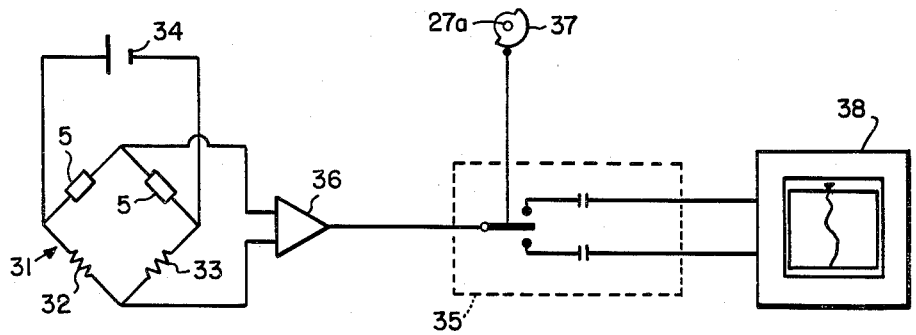
FIGURE 3 illustrates the electrical measuring circuit.

Referring to FIGURE 3, the thermosensitive detectors 5 which are located in chambers 3 and 4 as shown in FIGURE 2, are connected in a Wheatstone bridge circuit 31 with two resistances 32 and 33. A current source 34 feeds this bridge. A current-rectifier 35, connected with the suitable diagonal of the Wheatstone bridge through a suitable amplifier 36, is actuated synchronously with the three-way valve 13 by a cam 37 secured to the shaft 27$a$ on which the cam 27, shown in FIGURE 1, is mounted. The signal, after being amplified and rectified, is recorded on recorder 38.

FIGURE 1 represents the use of the apparatus of the present invention for determining the amount of acetone in an acetone-air mixture supplied to the apparatus through the duct 19. The differential thermal analysis cell 2, the delay volume device 10 and the three-way valve 13 are placed in a common enclosure 30 lined with heat resisting and heat insulating material 31. The air containing acetone from source 19 and pure air from source 18 are alternately supplied to the cell 2 by the valve 13, the period of this cycle being T which is calculated in agreement with the volume of the delay volume device 10 and the flow of gas caused by the pump 12.

The useful signal measured directly on the detection diagonal of the Wheatstone bridge 31, formed by the thermal sensitive detectors 5 of the cell 2, has a crest ampiltude of 84 mv. for 1% in volume of acetone in the air at the ambient temperature. This permits one to detect with certainty proportions of acetone in the air of the order of 0.01%, in spite of the ground noise of the system. The same process can be used to measure, for example, the methane or hydrogen contained in the air.

The invention is not limited to the preferred embodiment but may be otherwise embodied or practiced within the scope of the following claims.

I claim:

1. Apparatus for analysis of fluids, comprising a differential analysis cell having a first and a scond analysis chamber of substantially identical volume, a detector in each chamber sensitive to a characteristic property of the fluid to be analyzed, each of said chambers having an inlet orifice and an outlet orifice, a delay volume device connecting the outlet orifice of said first analysis chamber with the entrance orifice of said second analysis chamber, means for alternately supplying equal volume charges of fluid to be analyzed and a reference fluid to the inlet of said first analysis chamber, the volume of said delay volume device plus the volume of one of said analysis chambers being equal to the volume of one of said charges so that at the completion of the supplying cycle each of said analysis chambers and said delay volume device are filled with only one of said two fluids, means for circulating fluids through said cell, a bridge circuit, said detectors being connected in said bridge circuit, and means for measuring the periodic signals produced by said detectors.

2. A method of analyzing fluids, which comprises alternately circulating through a differential analysis cell having two analysis chambers arranged in series and separated by a delay volume device and provided with detectors sensitive to a characteristic property of the fluid to be analyzed, equal volume charges of the fluid to be analyzed and of a reference fluid, and regulating the circulation so that at the completion of the supplying cycle each of said analysis chambers is filled with only one of said two fluids.

References Cited in the file of this patent
UNITED STATES PATENTS

| | | |
|---|---|---|
| 2,579,352 | White | Dec. 18, 1951 |
| 2,694,923 | Carpenter | Nov. 23, 1954 |
| 2,826,908 | Skarstrom | Mar. 18, 1958 |
| 2,883,270 | Johnson | Apr. 21, 1959 |